United States Patent [19]
Richardson

[11] Patent Number: 5,152,488
[45] Date of Patent: Oct. 6, 1992

[54] MICROTRANSLATOR

[76] Inventor: David Richardson, 2588 Knightsbridge La., Santa Clara, Calif. 95051

[21] Appl. No.: 352,375

[22] Filed: May 16, 1989

[51] Int. Cl.⁵ .................................. G01B 5/00
[52] U.S. Cl. ..................... 248/274; 248/913; 74/470
[58] Field of Search ............... 248/122, 124, 424, 178, 248/274, 913, 660, 661; 74/470, 471 XY, 522; 350/529, 531, 530; 73/866.5

[56] References Cited

U.S. PATENT DOCUMENTS

| | | | |
|---|---|---|---|
| 2,593,643 | 4/1952 | Woolf | 74/470 |
| 2,595,282 | 5/1952 | Monchablon | 74/470 |
| 3,295,808 | 1/1967 | Webb | 248/178 |
| 3,318,593 | 5/1967 | Guernet | 350/530 |
| 3,407,018 | 10/1968 | Miller | 74/522 |
| 3,785,218 | 1/1974 | Czapek | 74/522 |
| 4,497,465 | 2/1985 | Yeakley | 248/274 |
| 4,635,887 | 1/1987 | Hall | 350/531 |

FOREIGN PATENT DOCUMENTS

| | | | |
|---|---|---|---|
| 1269370 | 5/1968 | Fed. Rep. of Germany | 248/178 |
| 433024 | 9/1947 | Italy | 74/470 |

OTHER PUBLICATIONS

Aronstein, J., "Frictionless X, Y, Z and Theta Micropositioning", IBM Technical Disclosure Bulletin, May 1973, vol. 15, No. 12.

Primary Examiner—Ramon O. Ramirez
Assistant Examiner—Robert A. Olson

[57] ABSTRACT

Apparatus for holding a small workpiece or probe in a fixed orientation and for translating the workpiece/probe in one, two or three perpendicular directions by various displacement mechanisms. One embodiment uses two curvilinear frames of constant width, across which two other planar frames move for displacement in one direction. A second embodiment uses a flexible sheet frame resembling a parallelogram for displacement in one direction. A third embodiment uses a different parallelogram configuration. These and other displacement mechanisms are combined to allow displacement in one, two or three perpendicular directions.

19 Claims, 4 Drawing Sheets

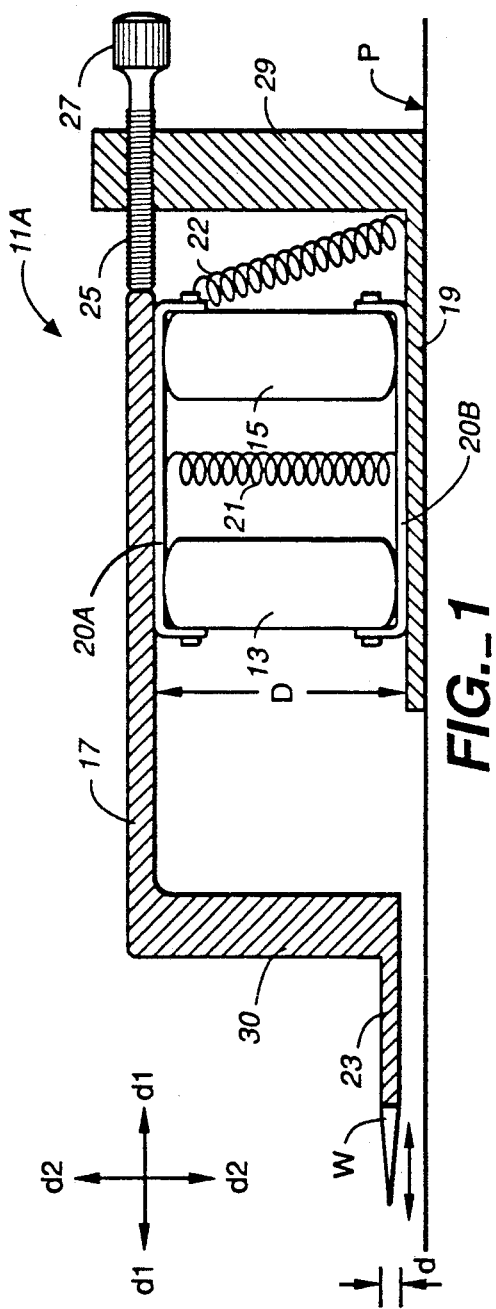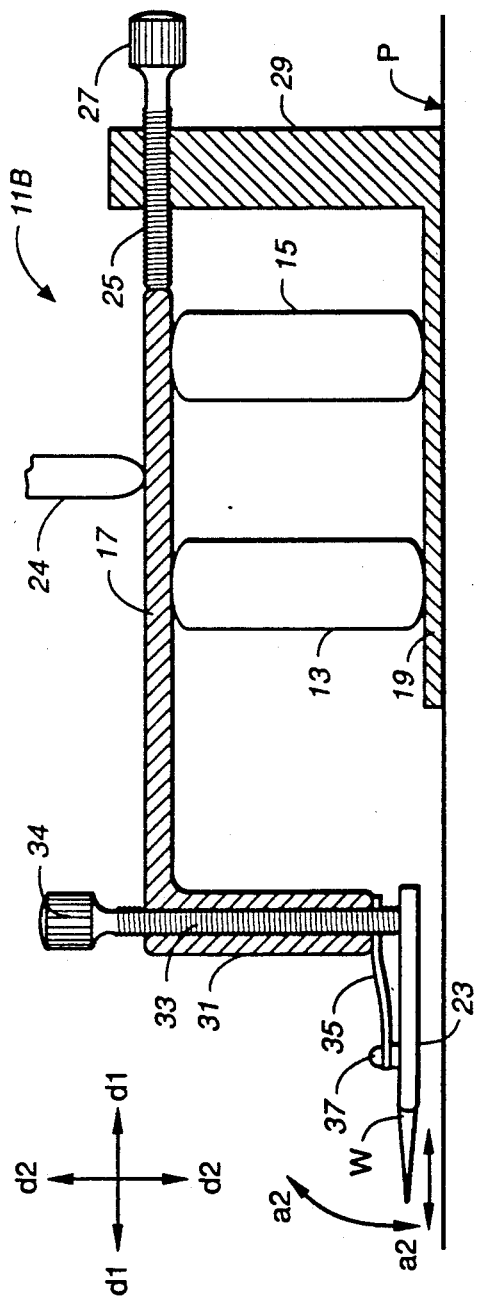

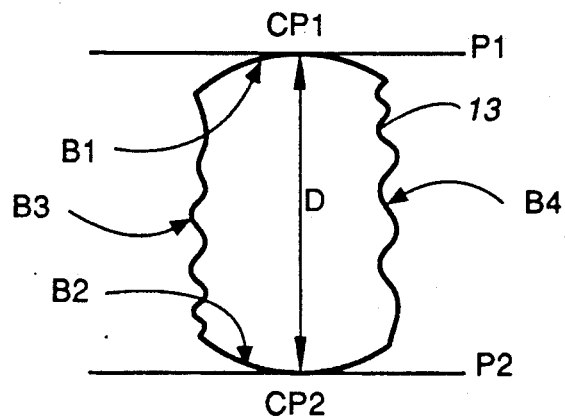
FIG._2
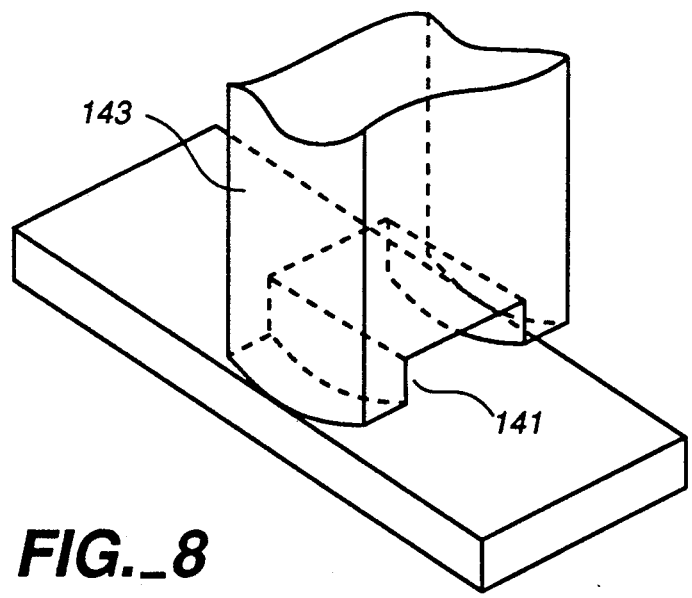
FIG._8

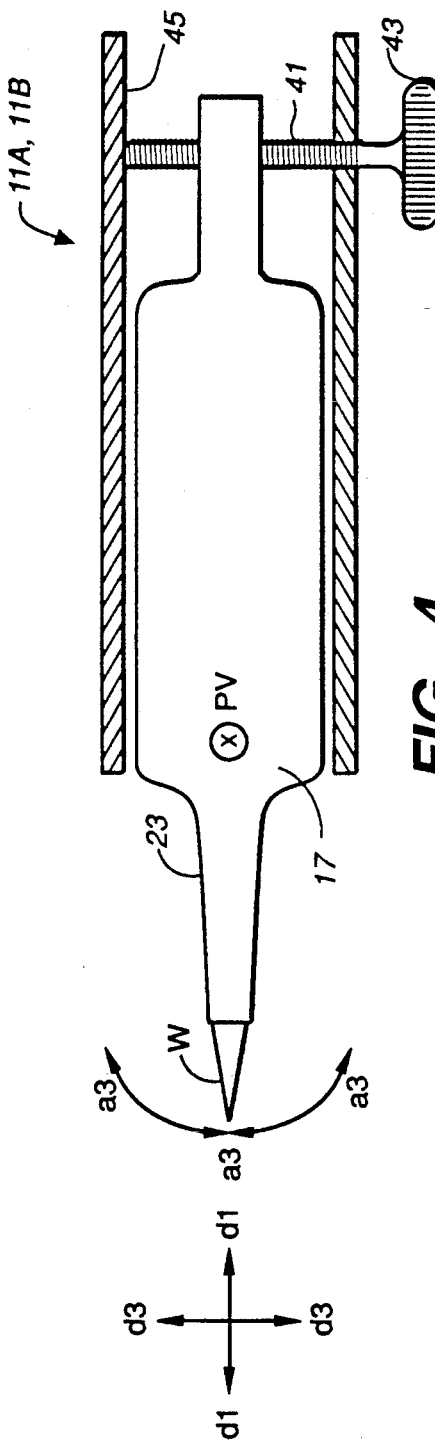
FIG._4
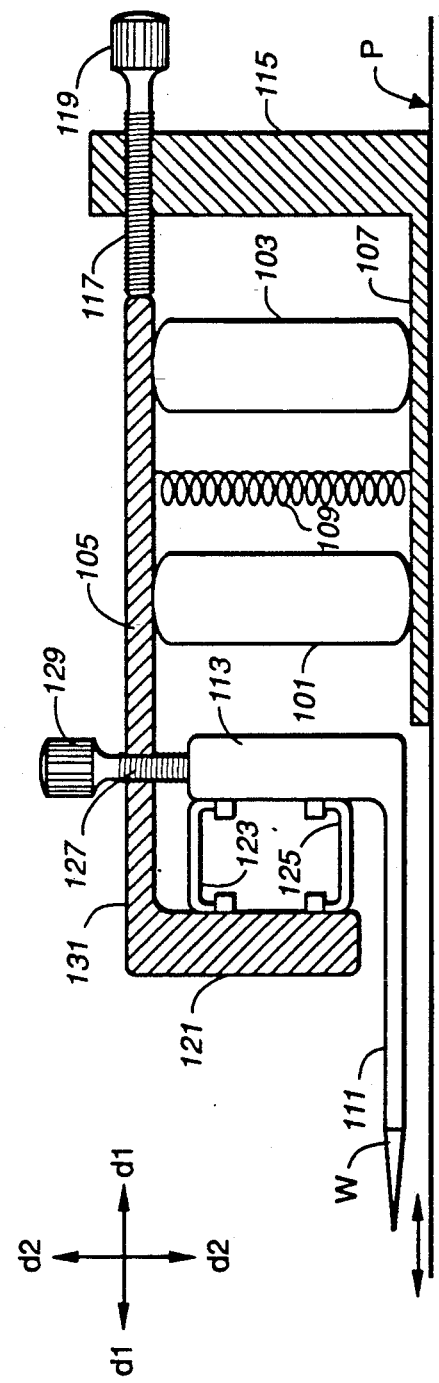
FIG._7

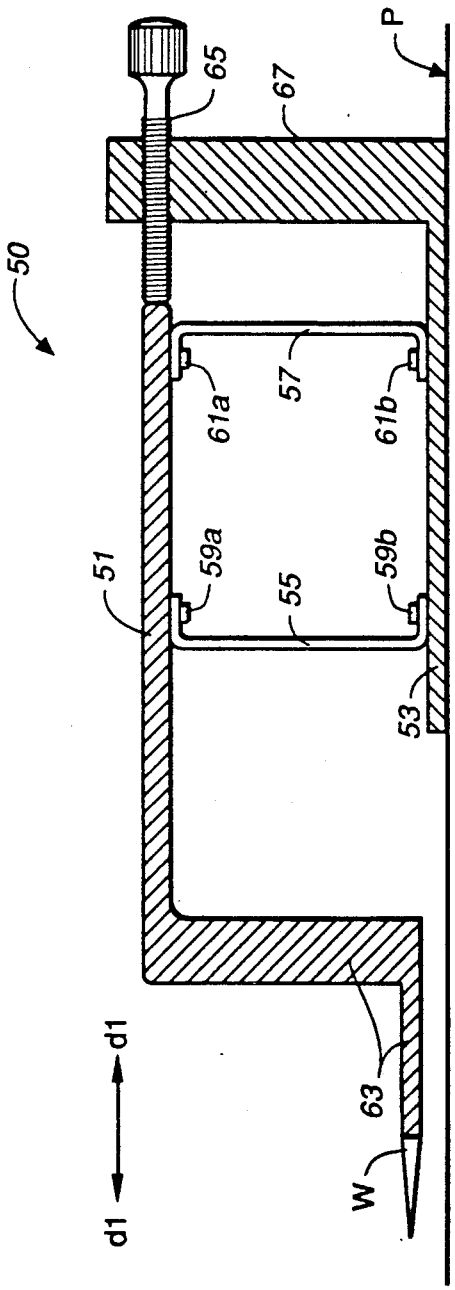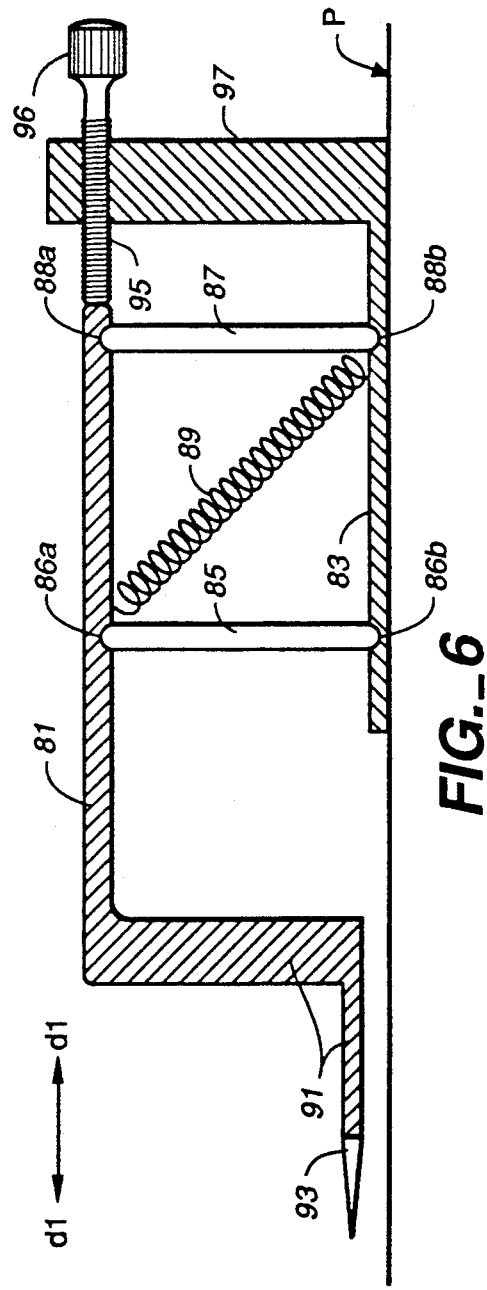

MICROTRANSLATOR

FIELD OF THE INVENTION

This invention relates to apparatus for holding a small workpiece and for moving the workpiece by small controllable distances in one, two or three dimensions relative to a fixed point of reference.

BACKGROUND OF THE INVENTION

In fields as diverse as fabrication of semiconductors, micro- machining, and monitoring/processing of biological samples, micromanipulators are used to hold small workpieces or probes and to move such items in one, two or three dimensions relative to a fixed base or reference point. Many apparati have been developed and offered to fill these needs. Examples are: eight three-dimensional manipulators, offered with a magnetic tape base, a rare earth magnet base or a vacuum base by The Micromanipulator Company, Inc. of Carson City, Nev.; a plurality of models for two- and three-dimensional movement for use with microscope-controlled positioning and offered by Karl Suss America, Inc. of Waterbury, Vt.; five models offered by Wentworth Labs., Inc. of Brookfield, Conn. for one-, two- and three-dimensional translation by manual or electromagnetic control; three models for one- and three-dimensional translation offered by Signatone of Santa Clara, Calif.; five models for three-axis movement offered by GGB Industries, Inc. of Naples, Fla.; and three models for three-axis translation offered by Rucker & Kolls of Santa Clara, Calif.

In many of these apparati, if a workpiece or probe is translated in a first horizontal direction, the height of the workpiece or probe, measured in a vertical direction, changes by an amount that varies with the amount of horizontal translation. Further, upon closer examination, many of these micromanipulators are of complex construction and are therefore relatively expensive and subject to malfunction or disfunction as parts wear accumulates.

What is needed is a relatively simple apparatus, with few moving parts, that allows translation in up to three perpendicular directions so that translation along a horizontal axis does not substantially affect the workpiece coordinates measured in a plane perpendicular to this axis.

SUMMARY OF THE INVENTION

These needs are met by the invention which, in one embodiment, includes two rotatable frames of curvilinear cross-section that rotate together to provide controllably small movement in a first horizontal direction and, simultaneously, provide no movement in a plane that is perpendicular to this direction. This embodiment relies upon: first and second curvilinear frames, spaced apart and parallel, each frame having a cross-section cross-section including two curvilinear boundary components that together form part of a planar set of constant width; substantially planar third and fourth frames, oriented parallel to one another and spaced apart and positioned so that the third frame rests against and is tangent to a first curvilinear boundary of each of the first and second curvilinear frames on one side thereof, and so that a fourth frame rests against and is tangent to a second curvilinear boundary of each of the two curvilinear frames on one side thereof; pressure means, such as a spring, to urge the third and fourth frames toward one another; a workpiece holder rigidly attached to the third frame; and displacement means connected to the third and fourth frames, to move the third frame by a controllable amount relative to the fourth frame in the predetermined direction so that the perpendicular distance between the first and second planar frames remains approximately constant.

In a second embodiment of the invention, first, second, third and fourth frames are provided, with the first and second frames spaced apart and the third and fourth frames spaced apart, with the third and fourth frames each having a first end that makes contact with the first frame on a side thereof and each having a second end that makes contact with the second frame on a side thereof. The third and fourth frames extend between the first and second frames, and the four frames form a parallelogram. The third and fourth frames rotate to allow the first and second frames to translate relative to one another in the predetermined direction. This embodiment is also provided with pressure means and displacement means as in the first embodiment.

In a third embodiment, first and second frames, spaced apart, are provided, and flexible third and fourth frames are spaced apart from each other and extend between and are rigidly attached to the first and second frames so that translation of the first frame relative to the second frame in the predetermined direction is resisted by bending or other flexing of the third and fourth frames. This embodiment is also provided with displacement means as in the first embodiment.

BRIEF DESCRIPTION OF THE DRAWINGS

FIG. 1 is a schematic cross-sectional view of a first embodiment of the invention, which uses a spring or similar tension means to urge two planar frames together.

FIG. 2 is a cross section of one of the two curvilinear cross-section frames used in FIGS. 1 and 3.

FIG. 3 is a schematic cross-sectional view of the first embodiment, using compression means, such as one or more rollers, with vertically oriented pressure to urge two planar frames together.

FIG. 4 is a schematic bottom view of the embodiment shown in FIGS. 1 or 3, illustrating a displacement means to provide movement of the workpiece or probe in a third direction.

FIG. 5 is a schematic cross-sectional view of a second embodiment of the invention, which uses rotation or bending of a flexible quadrilateral frame to provide movement in a given direction.

FIG. 6 is a schematic cross-sectional view of a third embodiment of the invention, which uses rotation of a quadrilateral frame to provide movement in a given direction.

FIG. 7 is a schematic view of a fourth embodiment of the invention, illustrating use of the two curvilinear frames and a flexible quadrilateral frame to provide movement in each of two perpendicular directions.

FIG. 8 is a perspective cross-sectional view of a modification to a curvilinear section of a curvilinear frame in the first and fourth embodiments that suppresses transverse rocking in the plane.

DETAILED DESCRIPTION

FIG. 1 illustrates a first embodiment 11A of the apparatus, which relies upon the action of two spaced apart frames 13 and 15 of curvilinear cross-section, each of which is a three-dimensional body that is a curvilinear polygon with four or more sides or boundaries in one cross-sectional view, with at least two boundary components B1 and B2 being curvilinear, not linear, and being spaced apart and facing one another as illustrated in FIG. 2. The two boundaries B1 and B2 may each be sectors of a circle of predetermined radius R, and are chosen so that the points of contact CP1 and CP2 of two parallel lines or planes P1 and P2 that are tangent to the circle C define a diameter CP1-CP2 of the circle C. Thus, no matter how the two parallel lines or planes P1 and P2 are oriented, consistent with being tangent to the respective boundaries B1 and B2, the two contact points CP1 and CP2 are always the distance D=2R apart; the boundaries B1 and B2 are part of a set of constant width curvilinear components of the cross section, shown in FIG. 2, for the curvilinear frame 13 or 15. The remaining boundaries of the cross section of the frame 13 or 15, denoted B3 and B4 for simplicity in FIG. 2, may be of any shape. For example, these two boundaries may be linear or "flat" as shown in FIG. 1.

Returning to FIG. 1, the two curvilinear frames 13 and 15 are positioned between two planar frames 17 and 19 that are parallel to each other and spaced apart by a distance D; each planar frame 17 and 19 is tangent to each curvilinear frame 13 and 15 at one point or line thereof. The two planar frames 17 and 19 are urged together by a spring or other tension means 21 that is connected to each planar frame 17 and 19 and is maintained in tension. The two planar frames 17 and 19 may move parallel to one another in a predetermined direction, denoted d1—d1 in FIG. 1, by rolling or rocking across the curvilinear boundary components of the curvilinear frames 13 and 15. This will cause the curvilinear frames 13 and 15 to rotate together so that the planar frames 17 and 19 are still parallel so that the perpendicular distance between the two planar frames 17 and 19 is still D (i.e., unchanged with rotation of the curvilinear frames 13 and 15).

Optionally, a first thin sheet 20A of flexible metal, such as phosphor-bronze or Be/Cu or spring steel, may be bonded or attached to the underside of the planar frame 17 and to each of the adjacent curvilinear frames 13 and 15 on the side sections thereof, to provide lateral shear stress resistance for the structure. A second thin sheet 20B of similar flexible metal may be bonded or attached to the upper side of the planar frame 19 and to each of the adjacent curvilinear frames 13 and 15 on the side sections thereof. With these two flexible sheets 20A and 20B in place, the rocking motion of the planar frames 17 and 19 across the curvilinear frames 13 and 15 is not restricted; but any tendency of either of the curvilinear frames 13 and 15 to pop out from between the two planar frames 17 and 19 is suppressed. These sheets 20A and 20B may also be included in the embodiments shown in FIGS. 3 and 7.

The planar frame 17 is rigidly attached by some means such as an upright frame 30 to a holder 23 of a workpiece or probe W as illustrated in FIG. 1. As the planar frame 17 moves a given distance in the direction d1—d1 relative to the planar frame 19, the workpiece/probe W moves by this same distance in the direction d1—d1 relative to the planar frame 19; and the vertical distance d of the workpiece/probe W above a plane P upon which the planar frame 19 rests remains unchanged as the planar frame 17 moves. The planar frame 17 may be moved a controllable amount in the direction d1—d1 by a translation or displacement means, such as a screw 25 and associated screw rotator 27, that advances leftward toward and makes contact with one end of the planar frame 17, where the screw 25 is rotatingly coupled to an upright frame 29 that is rigidly attached to the planar frame 19 as illustrated in FIG. 1. As the screw 25 advances toward the left or retreats toward the right along the general direction d1—d1, the planar frame 17 similarly advances or retreats relative to the planar frame 19. Optionally, the planar frame 17 may have second tension means, such as a diagonally oriented spring 22 connecting the planar frame 17 to urge the planar frame 17 to move toward the right in the direction d1—d1. This provides resistance to movement toward the left of the planar frame 17 and the screw 25 or other displacement means. The second tension means may be positioned anywhere along the planar frames 17 and 19, consistent with providing a force to urge the planar frame 17 rightward along the direction d1—d1 relative to the planar frame 19.

If the apparatus 11A is intended to provide only one-dimensional translation of the workpiece/probe W, the planar frame 17 may be rigidly attached to the workpiece/probe W by the upright frame 30 as shown in FIG. 1.

If the apparatus 11A is intended to provide two-dimensional translation of the workpiece or probe W, in the first direction d1—d1 and in a second, approximately orthogonal direction d2—d2, the upright frame 30 in FIG. 1 may be replaced by a frame 31 that is rigidly attached to the first planar frame 17, that carries second displacement means, such as a rotatable screw 33 and associated rotator 34, and that is oriented in the general direction d2—d2, as illustrated by the apparatus 11B in FIG. 3. At one end of the upright frame 31 a planar sheet 35 of suitable thickness is rigidly attached thereto at one end of the sheet 35 adjacent to the workpiece/probe W; and the planar sheet 35 is flexed or bent and makes contact at a second end thereof with the workpiece/probe holder 23 by means of attachment means 37. The advancing screw or other translation means 33 makes contact with the holder 23 and, as the screw 33 advances toward the plane P, the plane of the holder 23 is rotated in a vertical plane approximately about the position of the attachment means 37. The workpiece/probe W then moves along an arcuate path, indicated as a2—a2, relative to the plane P and the second planar frame 19. The planar sheet 35 resists flexing or bending in its plane so that the downward travel of the screw 33 relative to the frame 17 is resisted by the combined action of the planar sheet 35 and the rotation of the workpiece/probe holder 23.

FIG. 4 is a schematic bottom view of an embodiment that is similar to the embodiments shown in FIGS. 1 and 3, but including the capacity to move the workpiece or probe W in a third direction, denoted d3—d3, that is substantially perpendicular to the plane defined by the directions d1—d1 and d2—d2. The planar frames 17 and 19 of FIGS. 1 and 3 in this embodiment are provided with a pivot point, denoted PV, in the plane P, about which the apparatus 11A or 11B can rotate in the plane P. This rotation is controlled by movement of a third displacement means, such as a screw 41 and screw rotator 43 that is rotatingly coupled to a planar frame 17 or 19, moves against a sidewall 45 of the apparatus to rotate this frame about the pivot point PV. As the planar frame 17 or 19 rotates about the pivot point PV, the workpiece/probe W follows an arcuate path a3—a3 that is approximately in the direction d3—d3 for small angles of rotation.

FIG. 3 also demonstrates use of a different pressure means to urge the two planar frames 17 and 19 toward one another, namely a roller or other contact pressure means 24 that makes contact with and is positioned on the opposite side of the planar frame 17 from the two curvilinear frames 13 and 15. The roller or other pressure means 24 allows the planar frame 17 to move in the direction d1—d1, but applies a pressure in the direction d2—d2 to urge the first planar frame 17 to move toward the second planar frame 19. Either the tension means 21 shown in FIG. 1 or the contact pressure means 24 shown in FIG. 3 may be used to urge the two planar frames 17 and 19 together in any of the embodiments shown in FIGS. 1, 3 and 7.

FIG. 5 illustrates another embodiment 50 of the invention that includes first and second frames 51 and 53, parallel and spaced apart and held apart by third and fourth curved flexible sheet frames 55 and 57 that are approximately parallel to each other and extend between the first and second planar frames 51 and 53. The third and fourth frames 55 and 57 may be thin, elastic planar sheets having sufficient flexural rigidity to resist bending in a direction perpendicular to the planes of these sheets. The third frame 55 is bent into a shallow U-shaped sheet and is rigidly attached to the first frame 51 by one or more bolts or other attachment means 59a, and is rigidly attached to the second frame 53 by one or more bolts or other attachment means 59b, at first and second ends, respectively, of the third frame 55. In a similar manner, the fourth frame 57 is bent into a shallow U-shaped sheet and is rigidly attached to the first frame 51 and to the second frame 53 at first and second ends, respectively, of the fourth frame 57 by bolts or other attachment means 61a and 61b, respectively. The third and fourth frames 55 and 57 resist but allow some movement of the first frame 51 relative to the second frame 53 in a first direction d1—d1 by bending or flexing. If the elastic limit of the third and fourth sheet frames 55 and 57 is not exceeded, these two frames will always seek to return themselves to upright equilibrium positions. The third and fourth frames 55 and 57 may be separated as shown or may be component parts of a unitary, flexible quadrilateral frame or parallelogram that resists movement by means of the flexural rigidity of the sheet that forms the frame. The first frame 51 is rigidly attached to a workpiece holder 63 that holds a workpiece or probe W so that workpiece/probe W and first frame 51 move together and by the same amount in the first direction d1—d1.

FIG. 6 illustrates another embodiment 80 of the invention, which includes first and second horizontally oriented frames 81 and 83, parallel and spaced apart and held apart by third and fourth vertically oriented, rotatable frames 85 and 87. The third and fourth frames 85 and 87 are also parallel and spaced apart so that the two frames 85 and 87 and portions of the frames 81 and 83 form a parallelogram. The first frame 81 and second frame 83 are urged toward one another by a spring or other tension means 89 that is maintained in tension and extends therebetween, or by the pressure or compression means 24 that is shown in FIG. 3. More than one spring or other tension means 89 may be used to urge the frames 81 and 83 together and to urge the third and fourth frames 85 and 87 into an approximately perpendicular orientation relative to the first and second frames 81 and 83. The upper and lower ends of the upright frame 85 are held in approximately semi-circular depressions 86a and 86b in the first and second planar frames 81 and 83, respectively, so that the upright frame 85 can rotate while maintaining contact with the frames 81 and 83. In a similar manner, the upright frame 87 is held in approximately semi-circular depressions 88a and 88b in the planar frames 81 and 83.

The first frame 81 is rigidly attached to a workpiece holder 91 that holds a workpiece or probe W so that, as the frame moves in a direction d1—d1 approximately parallel to the base or plane P upon which the apparatus 80 rests, the workpiece or probe 93 moves by the same amount in the direction d1—d1. The first frame 81 is moved by a controllable amount in the direction d1—d1 relative to the second frame 83 by an advancing and retreating screw 95 and associated rotator 96 or other displacement means that is anchored in a base 97 that is rigidly attached to the second frame 83. This produces one-dimensional motion in the direction d1—d1. Motion in a second, perpendicular direction may be provided by replacing the rigid workpiece holder 91 by the flexible workpiece holder illustrated in FIG. 3.

FIG. 7 illustrates combined use of the two curvilinear frames from the first embodiment with the flexible quadrilateral frame of the second embodiment to provide controllable displacement of a workpiece/probe holder in each of two perpendicular directions d1—d1 and d2—d2. Two curvilinear frames 101 and 103 are contained between an upper planar frame 105 and a lower planar frame 107 as shown and are contiguous to the underside of the upper planar frame 105 and are contiguous to the upper side of the lower planar frame 107. The two planar frames 105 and 107 are urged toward one another and against the two curvilinear frames 101 and 103 by tension means 109, such as the spring 109 that extends from the upper planar frame 105 to the lower planar frame 107, or by pressure means such as shown in FIG. 3. A workpiece/probe W is held by a workpiece/probe holder 111 that is displacably attached to the upper planar frame 105 by a vertical displacement means such as a screw 127 and screw rotator 129 that extends from the planar frame 105 downward to an upright frame 113 that is rigidly attached to the holder 111. Displacement of the planar frame 105 relative to the planar frame 107 is provided by a horizontal displacement means such as an upright frame 115 that is rigidly attached to the lower planar frame 107 and contains a screw 117 and screw rotator 119 that extends to one end of the upper planar frame 105 to urge the planar frame 105 toward the left, as in FIG. 1. The upper planar frame 105 also carries an upright frame 121 rigidly attached thereto; and the two upright frames 113 and 121 are spaced apart and approximately parallel to one another. Between these two upright frames 113 and 121, two flexible, shallow U-shaped sheets 123 and 125 are mounted to each upright frame, in a manner similar to that illustrated for the second embodiment shown in FIG. 5, but now rotated 90 degrees relative to the orientation shown in FIG. 5. A screw 127 and associated rotator 129 or other vertical displacement means provides controllable displacement of the workpiece/probe W in the direction d2—d2; and the horizontal displacement means 117 and 119 provides controllable displacement in the direction d1—d1.

FIG. 8 illustrates the optional provision of a notch 141, oriented in the first direction d1—d1, in one or more of the curvilinear components of a curvilinear frame 143 that is used in any of the embodiments shown in FIGS. 1, 3 or 7. Provision of such a notch 141 will suppress any tendency of the curvilinear frame 143 to rock or rotate transversely, i.e., in a direction that is perpendicular to the desired direction of rocking that allows the upper planar frame to move relative to the lower planar frame in the direction d1—d1. The notch 141 is preferably provided in at least one of the two curvilinear boundary components of each of the curvilinear frames. However, the notch 141, provided in one curvilinear boundary component of one of the curvilinear frames, may provide sufficient stability that no other notches are needed.

I claim:

1. A micromanipulator that allows controlled displacement of a workpiece in a predetermined direction, the micromanipulator comprising:

first and second curvilinear frames, each frame having two curvilinear boundary components that are spaced apart so that the two curvilinear components together define a set of constant width, the two curvilinear frames being spaced apart from, and approximately parallel to, each other;

first and second planar frames, spaced apart and substantially parallel to each other, and positioned so that the first planar frame makes contact with and is tangent to a first curvilinear boundary component of each of the first and second curvilinear frames on one side of the first planar frame, and so that the second planar frame makes contact with and is tangent to a second curvilinear boundary component of each of the first and second curvilinear frames on one side of the second planar frame so that the first and second curvilinear frames are each positioned between the first and second planar frames;

pressure means for urging the first and second planar frames toward each other to hold the first and second planar frames firmly against the first and second curvilinear frames;

a workpiece holder that holds a workpiece at a first end thereof and that is attached to the first planar frame; and displacement means, connected to the first and second planar frames, for moving the first planar frame by a controllable amount in the predetermined direction, relative to the second planar frame, so that the perpendicular distance between the first and second planar frames remains approximately constant.

2. A micromanipulator according to claim 1, further comprising second displacement means, connected to said first planar frame, for moving said first end of said workpiece holder by a controllable amount, relative to said second planar frame, in a second predetermined direction that is approximately perpendicular to said first predetermined direction.

3. A micromanipulator according to claim 2, wherein said second displacement means comprises:

a flexible plate, having a first end and a second end that are spaced apart from each other, attached at a first end thereof to said workpiece holder adjacent to said first end thereof, and attached directly or indirectly at a second end of the plate to said first planar frame so that the portion of the plate that lies between the first and second positions of attachment can bend or be controllably displaced in said second predetermined direction; and screw displacement means, rotatably attached to said first planar frame and having a first end that makes contact with said workpiece holder at a second end of the holder, for displacement of the second end of the workpiece holder relative to said first planar frame so that the flexible plate is bent or controllably displaced in said second direction and said first end of said workpiece holder is moved by a controllable amount in said second direction.

4. A micromanipulator according to claim 2, further comprising third displacement means, connected to said first planar frame, for moving said first end of said workpiece holder by a controllable amount, relative to said second planar frame, in a third predetermined direction that is approximately perpendicular to each of said first and second directions.

5. A micromanipulator according to claim 1, wherein said pressure means comprises a spring, maintained in tension and attached between said first and second planar frames.

6. A micromanipulator according to claim 5, wherein said spring is positioned between said first and second curvilinear frames.

7. A micromanipulator according to claim 1, wherein said pressure means comprises first and second force transmitting means, positioned in contact with said first planar frame and with said second planar frame, respectively, so that said first and second planar frames lie between the first and second force transmitting means, for urging said first and second planar frames toward each other.

8. A micromanipulator according to claim 1, wherein said first and second curvilinear boundary components of said first curvilinear frame are sectors of a circle.

9. A micromanipulator according to claim 1, wherein said first and second curvilinear boundary components of said second curvilinear frame are sectors of a circle.

10. A micromanipulator according to claim 1, wherein at least one of said first and second curvilinear frames has a notch formed therein in at least one of said first and second curvilinear boundary components, the notch being oriented in said first direction.

11. A micromanipulator according to claim 1, further comprising a bendable sheet, attached to each of said first and second curvilinear frames and positioned between each of said first and second curvilinear frames and said first planar frame.

12. A micromanipulator according to claim 1, further comprising a bendable sheet, attached to each of said first and second curvilinear frames and positioned between each of said first and second curvilinear frames and said second planar frame.

13. A micromanipulator that allows controlled displacement of a workpiece in a predetermined direction, the micromanipulator comprising:

first and second substantially planar frames, spaced apart and oriented substantially parallel to each other;

third and fourth substantially planar frames, spaced apart and oriented substantially parallel to each other, each having a first end that rotatably contacts the first planar frame on a first side thereof, and each having a second end that rotatably contacts the second planar frame on a first side thereof, so that the third and fourth planar frames each extend between the first and second planar frames;

pressure means for urging the first and second planar frames toward each other and against the first and second ends of the third planar frame and against the first and second ends of the fourth planar frame;

a workpiece holder that holds a workpiece at a first end thereof and that is attached to the first planar frame; and displacement means, connected to the first and second planar frames, for moving the first planar frame by a controllable amount in the predetermined direction relative to the second planar frame.

14. A micromanipulator according to claim 13, further comprising a second displacement means, connected to said first planar frame, for moving said first end of said workpiece holder by a controllable amount, relative to said second planar frame, in a second predetermined direction that is approximately perpendicular to said first direction.

15. A micromanipulator according to claim 14, wherein said second displacement means comprises:

a flexible plate, attached at a first end thereof to said workpiece holder adjacent to said first end of said workpiece holder and attached directly or indirectly at a second end of the plate to said first planar frame so that the portion of the plate that lies between the first and second positions of attachment can bend in said second direction; and screw displacement means, rotatably attached to said first planar frame and having a first end that makes contact with said workpiece holder at a second end of the holder, for displacement of the second end of the holder relative to said first planar frame so that the flexible plate is bent in said second direction and said first end of said holder is moved by a controllable amount in said second direction.

16. A micromanipulator according to claim 14, further comprising third displacement means, connected to said first planar frame, for moving said first end of said workpiece holder by a controllable amount, relative to said second planar frame, in a third predetermined direction that is approximately perpendicular to each of said first and second directions.

17. A micromanipulator according to claim 13, wherein said pressure means comprises a spring, maintained in tension and attached between said first and second planar frames.

18. A micromanipulator according to claim 17, wherein said spring is positioned between said first and second curvilinear frames.

19. A micromanipulator according to claim 13, wherein said pressure means comprises first and second force transmitting means, positioned in contact with said first planar frame and with said second planar frame, respectively, so that said first and second planar frames lie between the first and second force transmitting means, for urging said first and second planar frames toward each other.

* * * * *